United States Patent [19]

Fallein

[11] 4,088,414
[45] May 9, 1978

[54] COUPLING FOR JOINING SECTIONS OF PIPE AND METHOD FOR ITS USE

[76] Inventor: Daryl L. Fallein, 15716 E. Sprague, Veradale, Wash. 99037

[21] Appl. No.: 719,963

[22] Filed: Sep. 2, 1976

[51] Int. Cl.² ............................................. F16B 13/00
[52] U.S. Cl. ..................................... 403/282; 29/525; 285/370; 285/382.4; 403/292
[58] Field of Search ..................... 285/397, 370, 382.4, 285/382.5, 382, 382.1, 382.2, 398, 371; 403/282, 280, 281, 292, 297; 29/525, 520; 61/53

[56] References Cited

U.S. PATENT DOCUMENTS

| | | | |
|---|---|---|---|
| 1,188,485 | 6/1916 | Pruyn | 285/397 X |
| 1,921,642 | 8/1933 | Stephenson | 403/282 X |
| 2,821,415 | 1/1958 | Race | 285/397 X |
| 3,002,871 | 10/1961 | Tramm et al. | 285/397 X |
| 3,353,850 | 11/1967 | Butz et al. | 285/370 X |
| 3,466,738 | 9/1969 | Mount | 29/525 |
| 3,467,414 | 9/1969 | Downing | 285/397 X |

FOREIGN PATENT DOCUMENTS

| | | | |
|---|---|---|---|
| 358,490 | 4/1938 | Italy | 285/397 |
| 726,507 | 3/1955 | United Kingdom | 285/370 |

*Primary Examiner*—Thomas F. Callaghan
*Attorney, Agent, or Firm*—Oliver D. Olson

[57] ABSTRACT

A coupling for joining sections of tubular pipe together end to end into a continuous length includes a tubular connector having an outside diameter substantially equal to the inside diameter of the pipe and having a protruding annular shoulder of arcuate cross section located intermediate its ends. The adjacent ends of the pipes are placed over opposite ends of the connector and pressed together, flaring their terminal portions outwardly where they abut, substantially coplanar with the diametric center of the shoulder, frictionally joining both sections of pipe to the connector. A metallic colored, silicone sealant is coated over the confronting raw ends of the pipes to provide a low maintenance seal which protects the joint from deterioration.

2 Claims, 3 Drawing Figures

U.S. Patent     May 9, 1978     4,088,414
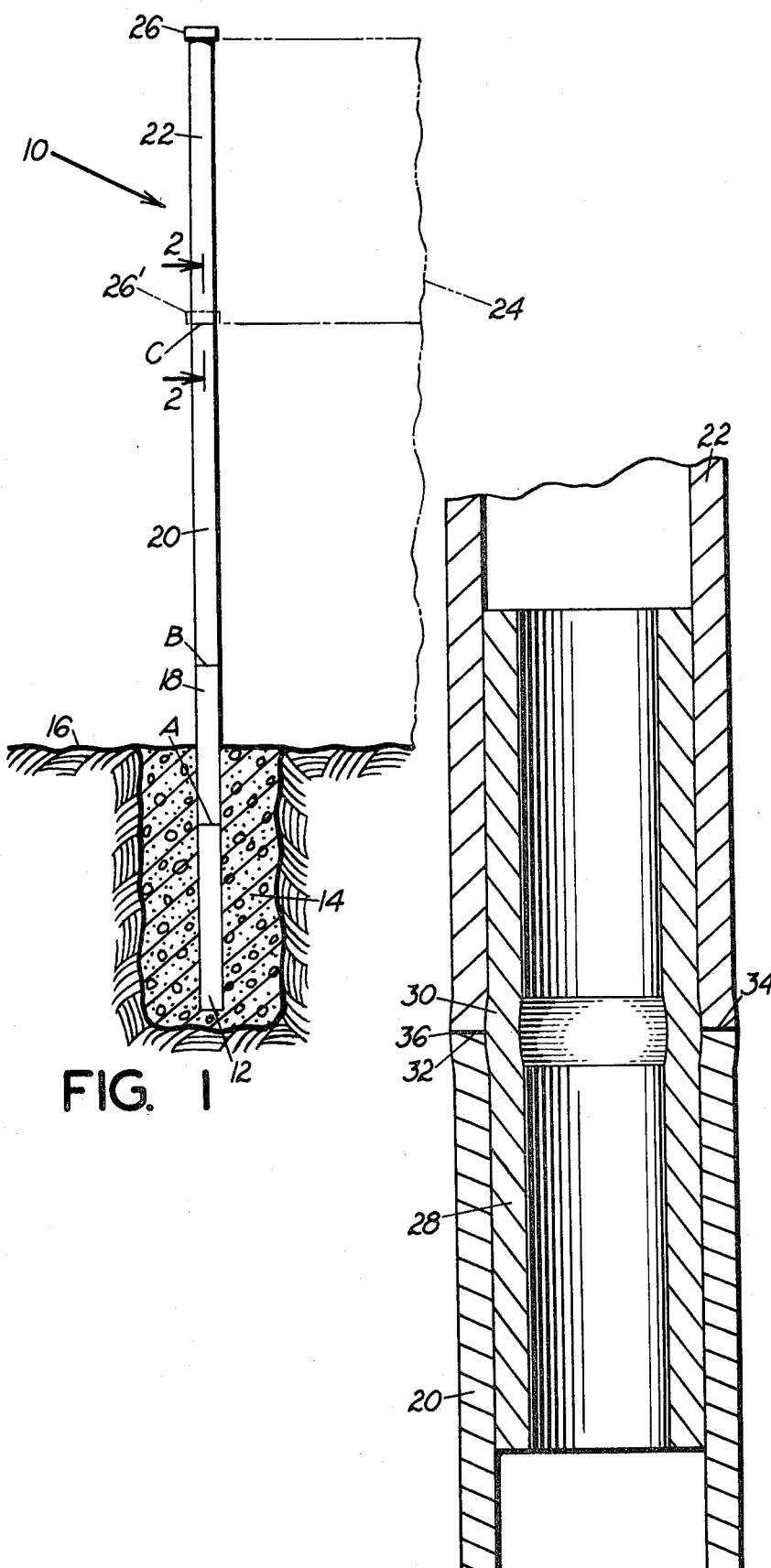
FIG. 1
FIG. 2
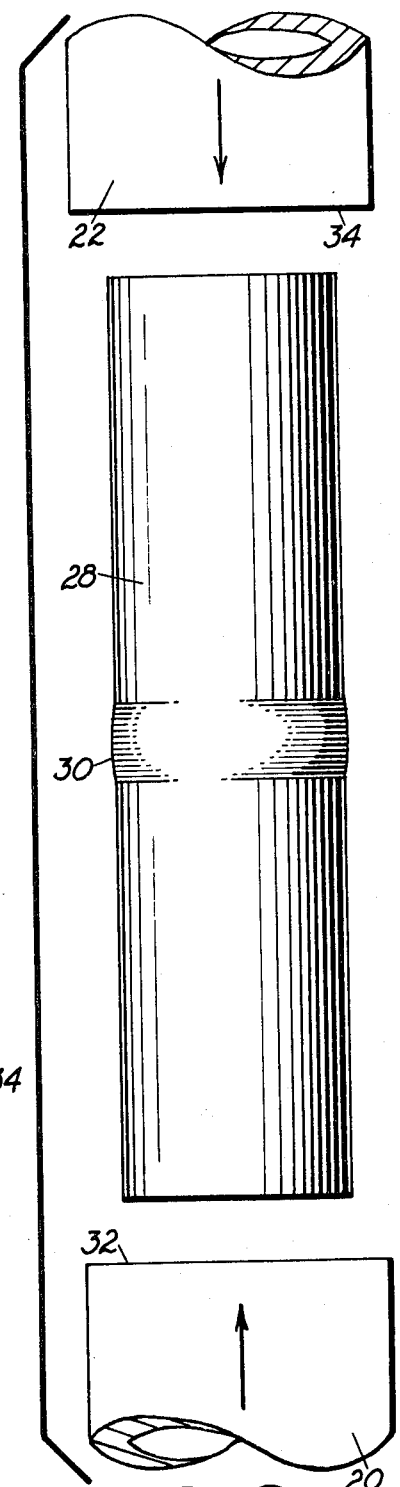
FIG. 3

4,088,414

COUPLING FOR JOINING SECTIONS OF PIPE AND METHOD FOR ITS USE

BACKGROUND OF THE INVENTION

This invention relates to a coupling for joining adjacent sections of pipe and to the method for its use. In particular it relates to such a coupling which frictionally joins said pipe sections without application of additional bonding means.

In the construction of chain link fences there commonly is a considerable amount of wastage of the pipe material used for posts. Pipe is manufactured in standard lengths, for example 21 feet, which does not lend itself to multiples of the standard fence post heights. Thus, when the pipe is cut to length a relatively short section remains from each piece.

Heretofore, these left over sections generally have been scrapped, although attempts have been made to salvage them by welding into sections of acceptable length. However, the cost of welding makes this economically unattractive.

In addition, if the weld is left exposed it will rust, requiring application of an anti-rust coating at the weld. Due to aesthetic consideration, the entire length of the pipe must then be painted. As a result the post must be maintained by repainting periodically as the paint deteriorates.

SUMMARY OF THE INVENTION

In its basic concept, the coupling of the present invention comprises a cylindrical connector configured for fitting within the adjacent ends of sections of pipe and having a protruding annular shoulder located intermediate its ends, the shoulder being of progressively increasing diameter toward its central plane, arranged for frictional engagement of the terminal portions of the pipe.

It is by virtue of the foregoing basic concept that the principal object of this invention is achieved; namely to overcome the disadvantages and limitations of prior art pipe couplings and methods of joining pipe sections.

Another object of this invention is to provide a coupling of the class described which can be adapted for joining all sizes of pipe.

Another object of this invention is to provide a coupling of the class described wherein the joint between the sections of pipe is protected from deterioration.

Another object of this invention is to provide a coupling of the class described which can be used for both above and below ground joints.

Another object of this invention is to provide a coupling of the class described which is of simplified construction for economical manufacture and is of rugged, unitary design permitting severe treatment in use.

The foregoing and other objects and advantages of this invention will appear from the following detailed description taken in connection with the accompanying drawing of a preferred embodiment.

BRIEF DESCRIPTION OF THE DRAWING

FIG. 1 is a vertical elevation, partially broken away, of a fence post comprising pipe sections joined by couplings embodying the features of this invention.

FIG. 2 is a fragmentary sectional view taken on the line 2—2 of FIG. 1.

FIG. 3 is a fragmentary vertical elevation showing the pipe sections and coupling in exploded view prior to joinder of the elements.

DESCRIPTION OF THE PREFERRED EMBODIMENT

Referring to FIG. 1, the post 10 of a chain link fence is shown incorporating the coupling of the present invention at junctions A, B, and C. In the embodiment shown the post comprises a first section of tubular pipe 12 encapsulated in concrete 14 poured into a hole in the ground 16; a second section of tubular pipe 18 joined to the first section at A and partially encapsulated in the concrete; a third section 20 joined to the second at B and located entirely above ground; and a fourth section 22 joined to the third section 20 at C and located entirely above ground. Combined, the four sections of pipe form a continuous length or post 10 which supports the fence material 24 and is capped at its terminal portion by cap 26.

A typical joint, best shown in FIG. 2 for joint C, comprises a cylindrical connector 28 having an outside diameter equal to the inside diameter of the pipes 20 and 22. The connector must have sufficient length to engage the pipes and give sufficient bearing support. For example, a length of approximately 6 inches for a 2 inches inside diameter pipe is quite satisfactory. In the embodiment illustrated the connector is tubular having a wall thickness of approximately ¼ inch.

The connector has a protruding annular shoulder 30 located intermediate its ends. The shoulder has an arcuate outside surface, as viewed in cross section, and is formed integrally with the connector such as by internally swaging the tubing.

The radius of curvature of the arcuate surface is quite large, it being desired that the maximum diameter of the shoulder be only slightly greater than the inside diameter of the pipe sections 20 and 22 to be joined.

The outer surface of the shoulder may increase linearly toward its central plane, rather than arcuately, as illustrated. The central plane thus may be a line or a relatively wide band of maximum diameter.

The connector is located symmetrically in the adjacent end portions of pipe sections 20 and 22 so that the diametric center, or central plane of the arcuate shoulder is coplanar with the confronting ends 32 and 34, respectively, of the pipe sections. Thus, the adjacent terminal portions of the pipes are flared slightly outward over the shoulder, causing the connector to remain centered in the pipe ends and frictionally joined to each.

A colored silicone sealant 36 preferably is applied to the confronting raw cut ends 32 and 34 to seal and protect them from deterioration. Preferably the sealant has a metalic color which matches the pipe material, thereby eliminating the need for painting of the joint.

The embodiment shown in FIG. 1 illustrates the versatility of the coupling of the present invention. For example, pipe section 12 is a short scrap length of pipe which originally was joined to a longer section of pipe at A to make the original post. In this instance after joint A was formed, it was positioned under ground where it is protected by the concrete 14. Pipe section 18 may be considered to be the remaining lower portion of the original longer section of pipe used in the original post, after the longer section was bent or otherwise damaged. Pipe section 20 represents a repair section added to the section 18 of the original post to replace the damaged upper portion which has been cut away. Joint B thus was formed on site to repair the fence.

Pipe section 22 represents an additional section added at a later date to increase the height of the fence, with joint C also being fabricated on site. The original cap 26' is shown in broken line as a point of reference.

The method of installing the connector for coupling the adjacent sections of pipes 20 and 22 is shown in FIG. 3. First the connector and the ends of the pipes are placed coaxially end to end, aligning the connector with the openings in the pipes. Then the pipes are slipped over the opposed ends of the connector and, after the ends 32 and 34 are coated with sealant 36, the pipes are pressed toward each other until their ends come into mutual abutment, in frictional contact with the shoulder 30. Thus, the terminal portions of the pipes are flared outwardly over the shoulder, frictionally engaging the pipe sections with the shoulder. Finally, a bead of fluid silicone sealant is placed around the periphery of the just-formed joint and allowed to cure.

It will be apparent to those skilled in the art that various changes may be made in the size, shape and arrangement of parts described hereinbefore. For example, although the tubular connector shown is preferred for its availability at low cost, in the form of a short section of scrap pipe, and ease of forming a shoulder, other types having circular cross section may be used if desired. Further, while the integral shoulder formed in the connector, such as by swaging, is preferred for its ease and economy of fabrication, the shoulder may be formed separately and joined to the length segment of the connector prior to use, if desired. Also the sealant may be coated over the periphery of the shoulder prior to insertion of a connector into the sections of pipe, causing it to be squeezed from between the confronting ends of the pipes upon installation. These and other modifications may be made, as desired, without departing from the spirit of this invention.

Having now described my invention and the manner in which it may be used, I claim:

1. The method of coupling adjacent sections of scrap tubular pipe end to end into a continuous length to form posts for chain link fences, comprising:
    a. placing the adjacent terminal portions of the sections of scrap pipe over opposed ends of a tubular connector having an outer diameter substantially equal to the inner diameter of the sections of pipe and having a length at least about three times its outside diameter and having a protruding annular shoulder located intermediate its ends, the shoulder being of progressively increasing diameter toward its central transverse plane with the diameter at said central plane being only slightly greater than the outer diameter of the end portions of the connector, and
    b. pressing said sections of scrap pipe together over said shoulder until their terminal ends abut at a point substantially coplanar with the central plane of the shoulder, thereby frictionally securing the scrap pipe sections to the connector.

2. A coupling for joining sections of scrap tubular pipe together end to end into a continuous length to form posts for chain link fences, comprising:
    a. a cylindrical connector having an outside diameter substantially equal to the inside diameter of the sections of scrap pipe and a length at least about three times its outside diameter,
    b. said connector having a protruding annular shoulder located intermediate its ends, the shoulder being of progressively increasing diameter toward its central transverse plane with the diameter of said central plane being only slightly greater than the outside diameter of the end portions of the connector,
    c. said connector being adapted to be located in the adjacent ends of sections of scrap pipe in a manner such that the abutting terminal ends of the scrap pipes are substantially coplanar with the central plane of the shoulder.

* * * * *